(12) United States Patent
Tardif (10) Patent No.: US 7,093,531 B2
(45) Date of Patent: Aug. 22, 2006

(54) SYSTEM FOR MAKING COFFEE (75) Inventor: Pierre Tardif, Longueuil (CA)

(73) Assignee: Trudeau Corporation 1889 Inc., Boucherville (CA)

( * ) Notice: Subject to any disclaimer, the term of this patent is extended or adjusted under 35 U.S.C. 154(b) by 0 days.

(21) Appl. No.: 10/445,644

(22) Filed: May 27, 2003

(65) Prior Publication Data

US 2004/0154471 A1 Aug. 12, 2004

(30) Foreign Application Priority Data

Feb. 12, 2003 (CA) .................... 2418741

(51) Int. Cl.
A47J 31/20 (2006.01)

(52) U.S. Cl. .......................... 99/297; 99/287

(58) Field of Classification Search ................. 99/297, 99/287
See application file for complete search history.

(56) References Cited

U.S. PATENT DOCUMENTS

| 1,053,735 | A | * | 2/1913 | Lefevre | 99/297 |
| 2,560,214 | A | | 7/1951 | Cameron | |
| 2,562,433 | A | | 7/1951 | Moore | |
| 2,645,173 | A | | 7/1953 | McWatters | |
| 2,935,928 | A | | 5/1960 | Keating | |
| 3,413,908 | A | * | 12/1968 | Nadelson | 99/297 |
| 4,365,544 | A | * | 12/1982 | Howitt | 99/297 |
| 5,031,517 | A | | 7/1991 | Yeh | |
| 5,761,987 | A | * | 6/1998 | Leon et al. | 99/297 |
| 5,887,510 | A | * | 3/1999 | Porter | 99/287 |
| 5,943,946 | A | | 8/1999 | Chen | |
| 6,240,833 | B1 | * | 6/2001 | Sham et al. | 99/297 |
| 6,324,966 | B1 | | 12/2001 | Joergensen | |
| 6,324,967 | B1 | | 12/2001 | Robinson | |

FOREIGN PATENT DOCUMENTS

| CA | 443175 | 7/1947 |
| CA | 915452 | 11/1972 |
| GB | 2381441 A | 7/2003 |
| WO | WO 01/67935 A1 | 9/2001 |

* cited by examiner

Primary Examiner—Reginald L. Alexander
(74) Attorney, Agent, or Firm—Schweitzer Cornman Gross & Bondell LLP (57) ABSTRACT Device having a cover to be positioned on a vessel with an interior wall. A shaft extends through a transverse passageway in the cover. A basket for holding a flavoring substance is mounted to the end of the shaft. The basket can thus be raised and lowered within the vessel through action of the shaft. A continuous lip of flexible polymer surrounds the periphery of the basket, for engagement with the interior wall of the vessel. With flavoring substance in the basket, liquid is poured into the vessel in such a way as to retain air in the space between the basket and the bottom of the vessel. The basket is pushed downwards, causing at least part of the air retained in the space between the basket and the bottom portion of the vessel to displace the flavoring substance while the air rises within the vessel, resulting in improved infusion of the flavoring substance.

37 Claims, 10 Drawing Sheets

SYSTEM FOR MAKING COFFEE

FIELD OF THE INVENTION

The present invention relates generally to devices for making infused beverages such as coffee, tea and the like.

BACKGROUND OF THE INVENTION

Infused beverages are highly popular in many parts of the world. In particular, tea and coffee are enjoyed by millions of people on a regular basis. In order to produce a satisfactory cup of tea or coffee, it is typically required to steep a flavoring substance, e.g., ground coffee beans or tea leaves, in hot water. The beans or leaves remain in the brew for a period of time that depends upon the desired strength of the infused beverage, upon which they must be removed lest the infused beverage turn bitter and insipid.

To satisfy avid consumers of infused beverages, the market has seen the emergence of various devices which allow a cup of brewed (as opposed to instant) coffee to be made without the need for electricity or a pressurized source of water. One such device is marketed under the trademark BODUM. This device includes a perforated disk which is attached to a stem at the end of which is a handle. In order to make an infused beverage, a flavoring substance is placed in the bottom of the vessel. Water is then poured into the vessel, following which the disk is inserted into the vessel. In the case of coffee, brewing thus takes place while the coffee grains are in contact with the bottom of the vessel. Once brewing has reached a desired level of completion, the handle is pushed down, bringing the disk towards the bottom of the vessel, hence capturing the coffee grains between the disk and the bottom of the vessel. In order to pour the brewed coffee, the vessel is tilted and the filter helps to block the spent coffee grains.

However, because the coffee grains remain in the vessel at all times, infusion can only be arrested by the act of pouring the coffee out of the vessel into a mug or cup. This is highly inconvenient if a mug or cup is not available. Also, the flavor of the coffee is dramatically altered if the coffee which remains in the vessel is reheated at a later time for delayed consumption. Moreover, for improved flavor, it is recommended that the disk be removed during the infusion process and the coffee grains stirred manually so as to disperse the grains throughout the infused beverage. This results in a loss of heat, with the additional problem of messiness, during the infusion process.

Clearly, therefore, there is a need in the industry for an improved system for making infused beverages.

SUMMARY OF THE INVENTION

According to a first broad aspect, the invention seeks to provide a device for making an infused beverage. The device comprises a cover adapted to be positioned on a vessel with an interior wall, as well as a shaft that extends through a transverse passageway in the cover. Also provided is a basket adapted to hold a flavoring substance, basket having a periphery and being mounted to the shaft such as to allow the basket to be raised and lowered within the vessel through action of the shaft. Finally, there is provided a continuous lip of flexible polymer surrounding the periphery of the basket, for engagement with the interior wall of the vessel.

According to a second broad aspect, the invention seeks to provide a system for making an infused beverage. The system comprises a vessel having an interior wall and a bottom portion, and an infusion control device. The infusion control device comprises (i) a cover adapted to be positioned on the vessel, the cover having a transverse passageway therethrough; (ii) a shaft extending through the passageway of the cover; (iii) a basket adapted to hold a flavoring substance, the basket having a periphery, the basket being mounted to the shaft such as to allow the basket to be raised and lowered within the vessel through action of the shaft. The periphery of the basket forms a fluid-tight seal with the interior wall of the vessel.

The present invention may be summarized according to a third broad aspect as a method of making an infused beverage. In a vessel having an interior wall and a bottom portion, a basket is provided in sealable engagement with the interior wall of the vessel, the basket holding a flavoring substance, there being a space between the basket and the bottom portion of the vessel. Next, liquid is poured into the vessel in such a way as to retain air in the space between the basket and the bottom portion of the vessel. Finally, the basket is moved towards the bottom portion of the vessel so as to cause at least part of the air retained in the space between the basket and the bottom portion of the vessel to displace the flavoring substance while rising within the vessel.

According to a fourth broad aspect, the invention seeks to provide a device for making an infused beverage. The device comprises a cover adapted to be positioned on a vessel with an interior wall, the cover having a transverse passageway therethrough, the cover having an upper surface facing away from the interior wall of the vessel and an opposite undersurface facing toward the interior wall of the vessel. The device further comprises a shaft extending through the passageway of the cover and a basket adapted to hold a flavoring substance. The basket has a periphery, is mounted to the shaft such as to allow the basket to be raised and lowered within the vessel through action of the shaft, and is movable between an upper position in which the basket is proximate the undersurface of the cover and a lower position in which the basket is remote from the undersurface of the cover. Also provided is a handle being movable between a first position in which the handle is remote from the upper surface of the cover and a second position in which the handle is proximate the upper surface of the cover. Finally, the device comprises a lock for securing the basket in the upper position while the handle is in the second position.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1:
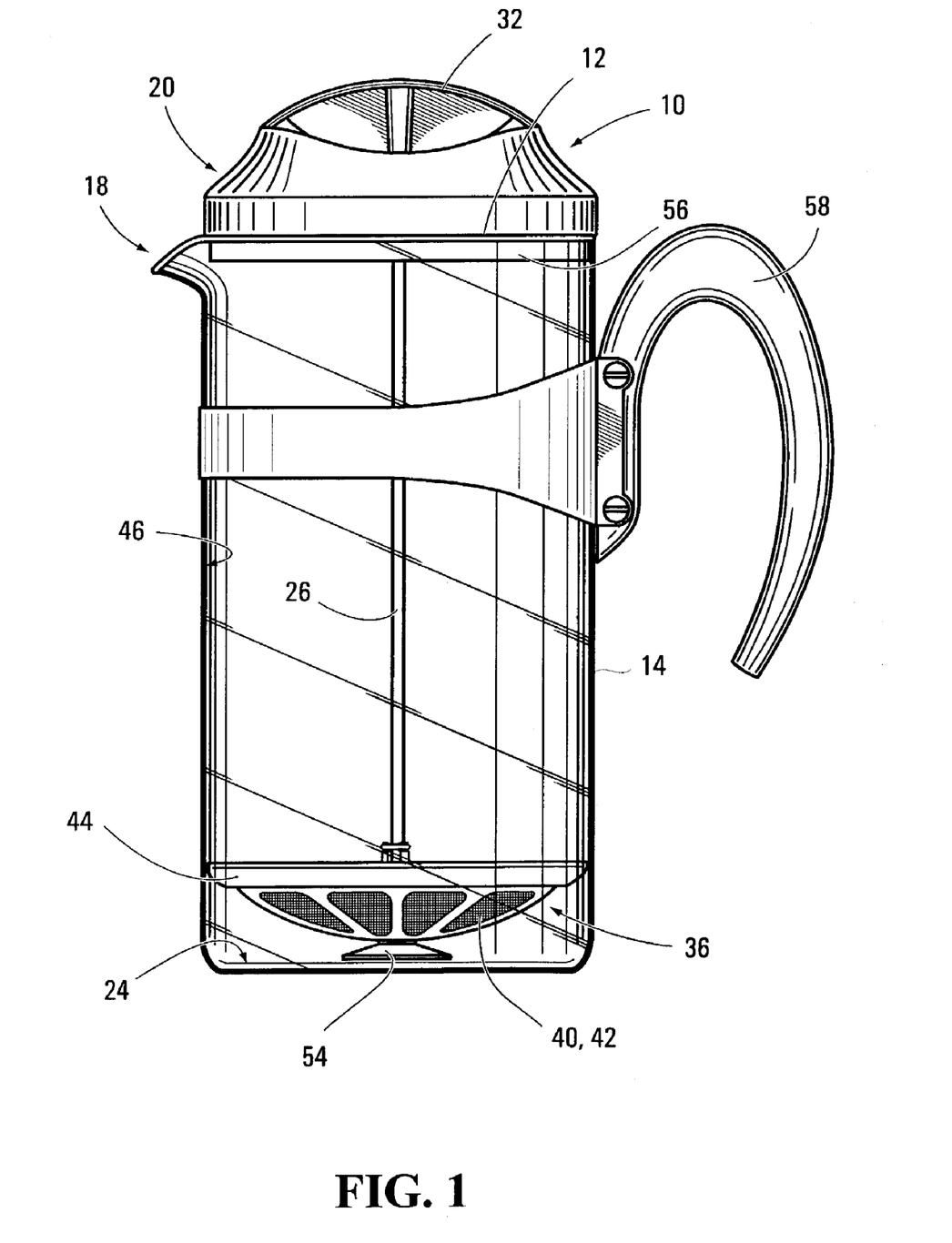
FIG. 1 is an elevational view of a system for making an infused beverage, in accordance with an embodiment of the present invention.
Figure 2:
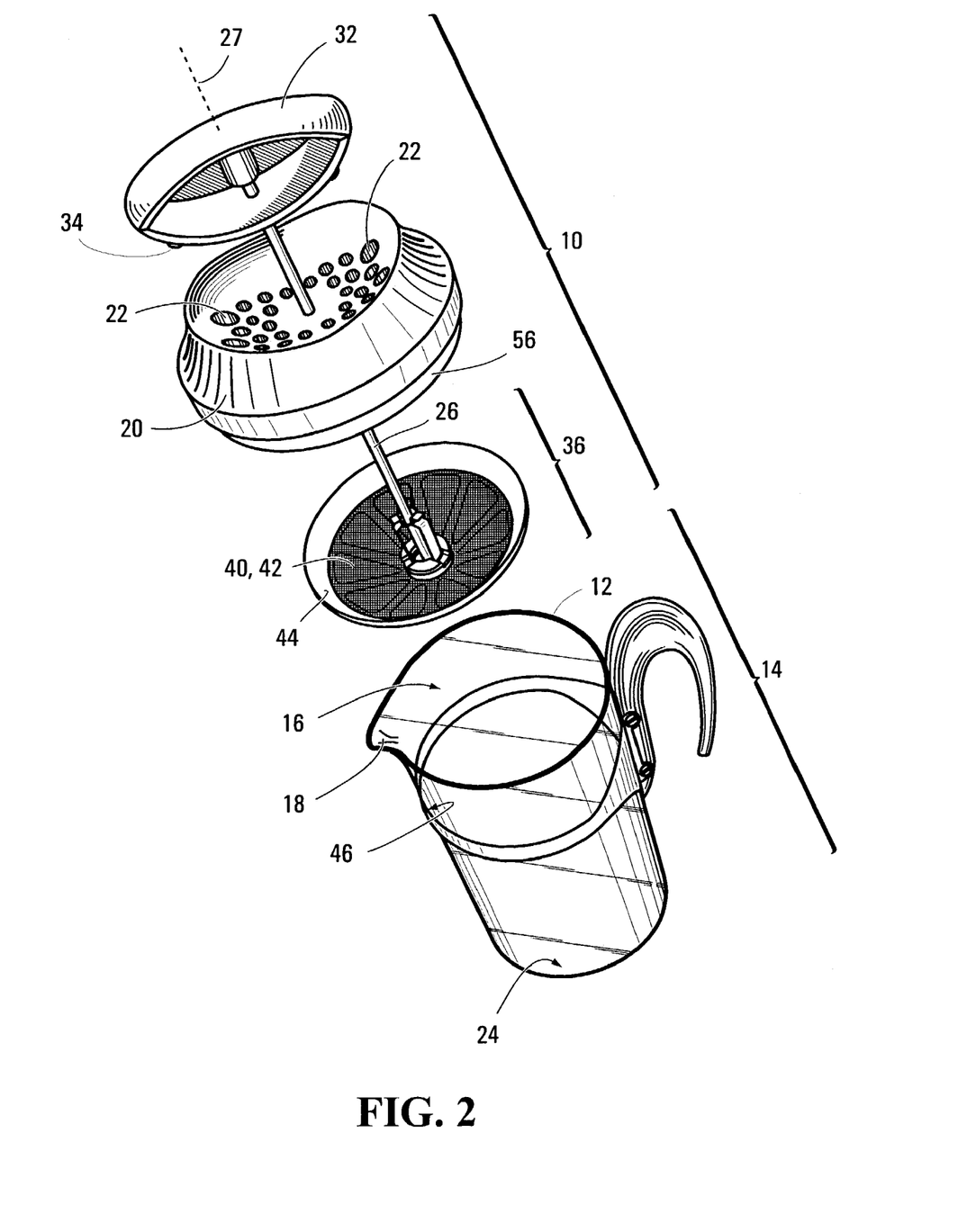
FIG. 2 is an exploded perspective view of the system of FIG. 1.

With reference to FIGS. 1 and 2, there is shown a system for making an infused beverage such as coffee or tea, for example. The system includes an infusion control device 10 mounted on a rim 12 of a vessel 14, which typically has a wide mouth 16 and a spout 18 for facilitating the pouring out of the infused beverage once infusion is complete. A grip 58 is also provided in order to allow a user to manipulate the vessel 14. The grip 58 can be of any standard shape or it can be of the type illustrated, where, by virtue of meeting an exterior surface of the vessel 14, the grip 58 serves the added function of protecting a potential user from being burned by heat from the infused beverage that is exchanged through the exterior surface of the vessel 14. To this end, the grip 58 may be designed to meet the exterior surface of the vessel 14 along a height extending at least the width of four adult fingers.

The device 10 has several main parts that are identifiable in FIGS. 1 and 2. In particular, the device 10 includes a cover 20 which rests atop the rim 12 of the vessel 14. The cover 20 can be suitably dimensioned for use with a variety of glass beakers or containers having standard sizes, or it can be specifically designed for use with a custom-made vessel. The cover 20 may be made from a thermally insulating material to minimize the loss of heat through the cover 20 during brewing. The cover 20 has a basin-like or trough-like upper surface and includes a distribution system 22 that allows fluid communication between the upper surface and an undersurface of the cover 20.

Also part of the device 10 is a shaft 26 which passes through the cover 20 in a transverse manner thereto, i.e., an axis 27 of the shaft 26 is perpendicular to the rim 12 when the vessel 14 is placed on a flat surface. The shaft 26 can be made of stainless steel or other durable, washable material. The shaft 26 passes through a passage in the cover 20. The passage can be in the center of the cover 20. As can best be seen in FIGS. 2 and 5–10, at one end 30 of the shaft 26 there is provided a handle 32 having an ergonomic design and made from a thermally insulating material to prevent the user from feeling the heat of the brew transferred by the shaft 26.

Figure 3:
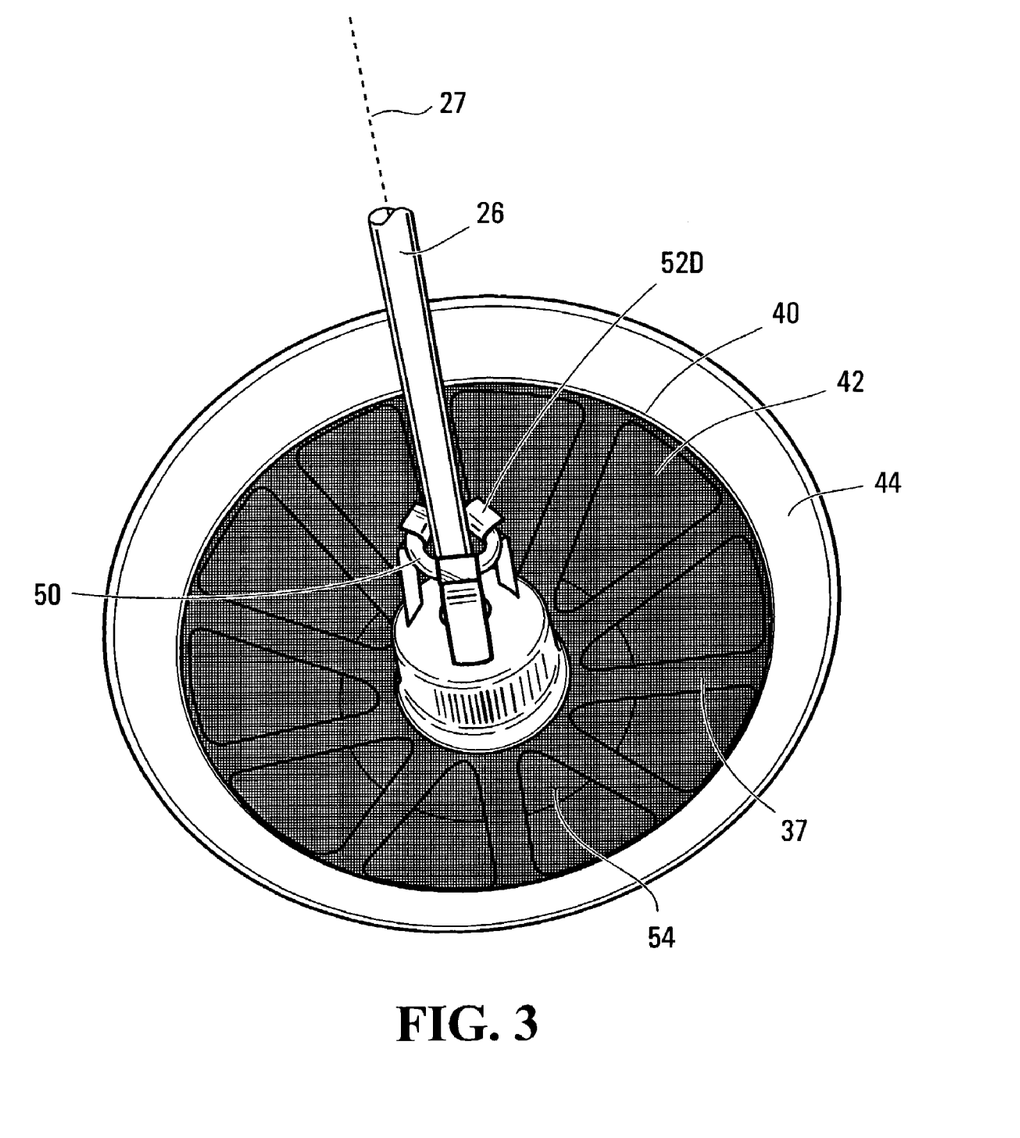
FIGS. 3 and 4 are a perspective and sectional view, respectively, of a basket forming part of the system of FIGS. 1 and 2.
Figure 4:
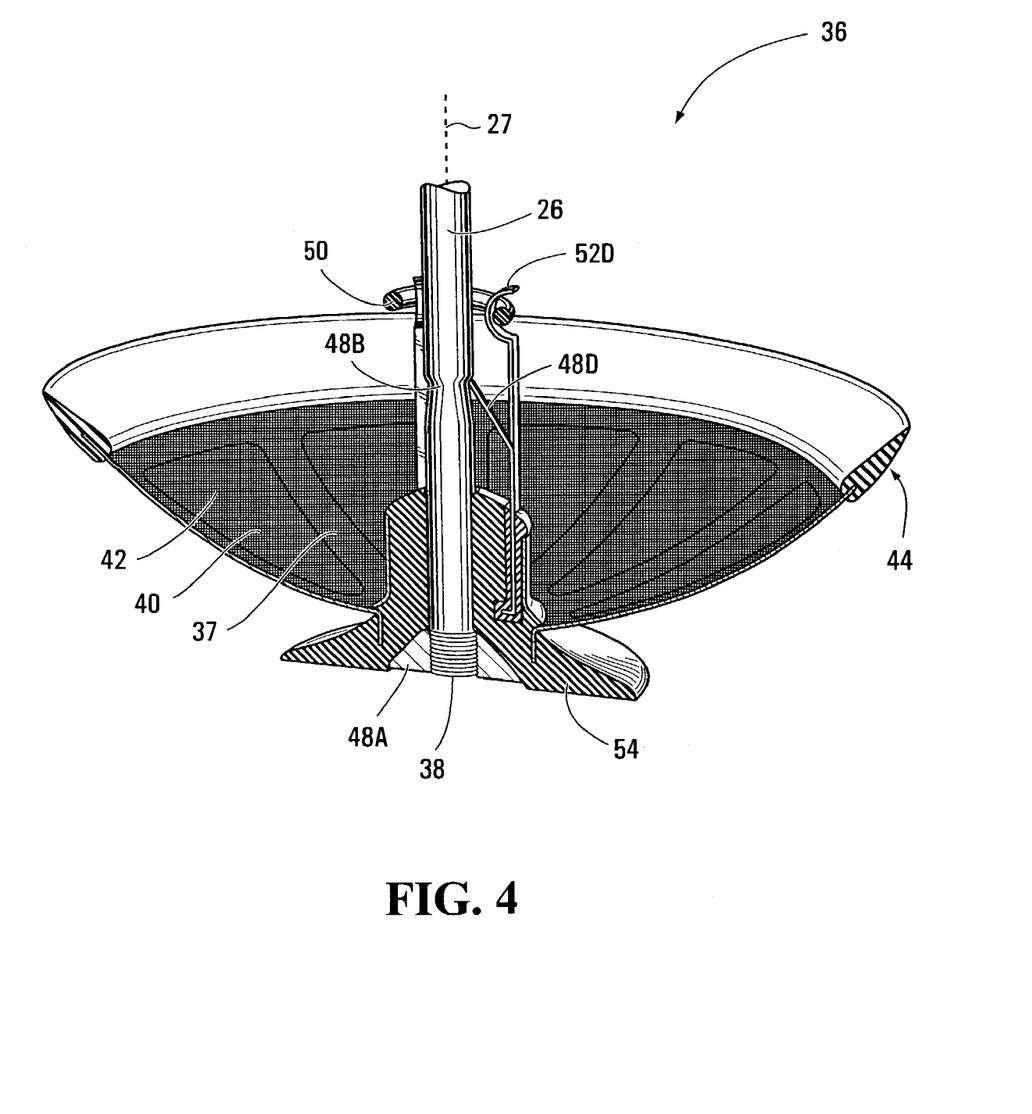

The device 10 further includes a basket 36 which can be slidably mounted to the shaft 26. The basket 36 is intended to hold a flavoring substance e.g., ground coffee beans, tea leaves, ginger root, herbs, flowers, etc., used to make the infused beverage. As seen most clearly in FIGS. 3 and 4, the basket 36 is chiefly composed of a frame 37 which supports a cup-shaped filter or screen 40 that can be made of stainless steel or other durable, washable material. A nylon screen 40 is also envisaged. The screen 40 has a mesh of perforations 42 that are sufficiently small to prevent the flavoring substance from falling through the screen 40 towards a bottom 24 of the vessel 14. Surrounding the frame 37 is a lip 44, which can be made of neoprene, thermoplastic or other rubber or any other suitable flexible polymer. In a specific embodiment, the lip 44 can be overmolded with respect to the frame 37 so as to eliminate the presence of joints in which the flavoring substance is liable to get caught.

The lip 44 is configured so that it establishes a fluid-tight seal with an interior wall 46 of the vessel 14 with which the device 10 is intended to be used. The fact that the lip 44 is made of a flexible compound allows for tolerances in the manufacture of the vessel 14, so that for a certain group of vessels 14 having slightly varying cross-sectional areas, the same device 10 can be used.

In use, particulate flavoring substance is placed into the basket 36 so as to cover the screen 40, typically forming a mound of flavoring substance. Due to the relatively small size of the apertures 42 of the screen 40, most of the flavoring substance will not fall through the screen 40 and hence will be retained in the basket 36. Through action of the shaft 26, the basket 36 containing the flavoring substance is lowered into the vessel 14, which should be substantially empty prior to use. The basket 36 is then lowered to a position that allows for further lowering of the basket 36 within the vessel 14. Of course, the basket 36 should also not remain too high within the vessel 14, or it might not be possible to introduce a sufficient amount of liquid into the vessel 14 for infusion. It is expected that individual users will be capable of easily determining a suitable level to which the basket 36 should be lowered within the vessel 14. In a non-limiting example scenario, the user may position the basket 36 at a point that is about three-quarters of the way towards the bottom 24 of the vessel 14.

It is noted that because of the sealable engagement between the lip 44 and the interior wall 46 of the vessel 14, and because of the coverage of the apertures 42 of the screen 40 by the particulate flavoring substance, a pocket of air is effectively created in a space 70 located between the underside of the basket 36 and the bottom 24 of the vessel.

Figure 5:
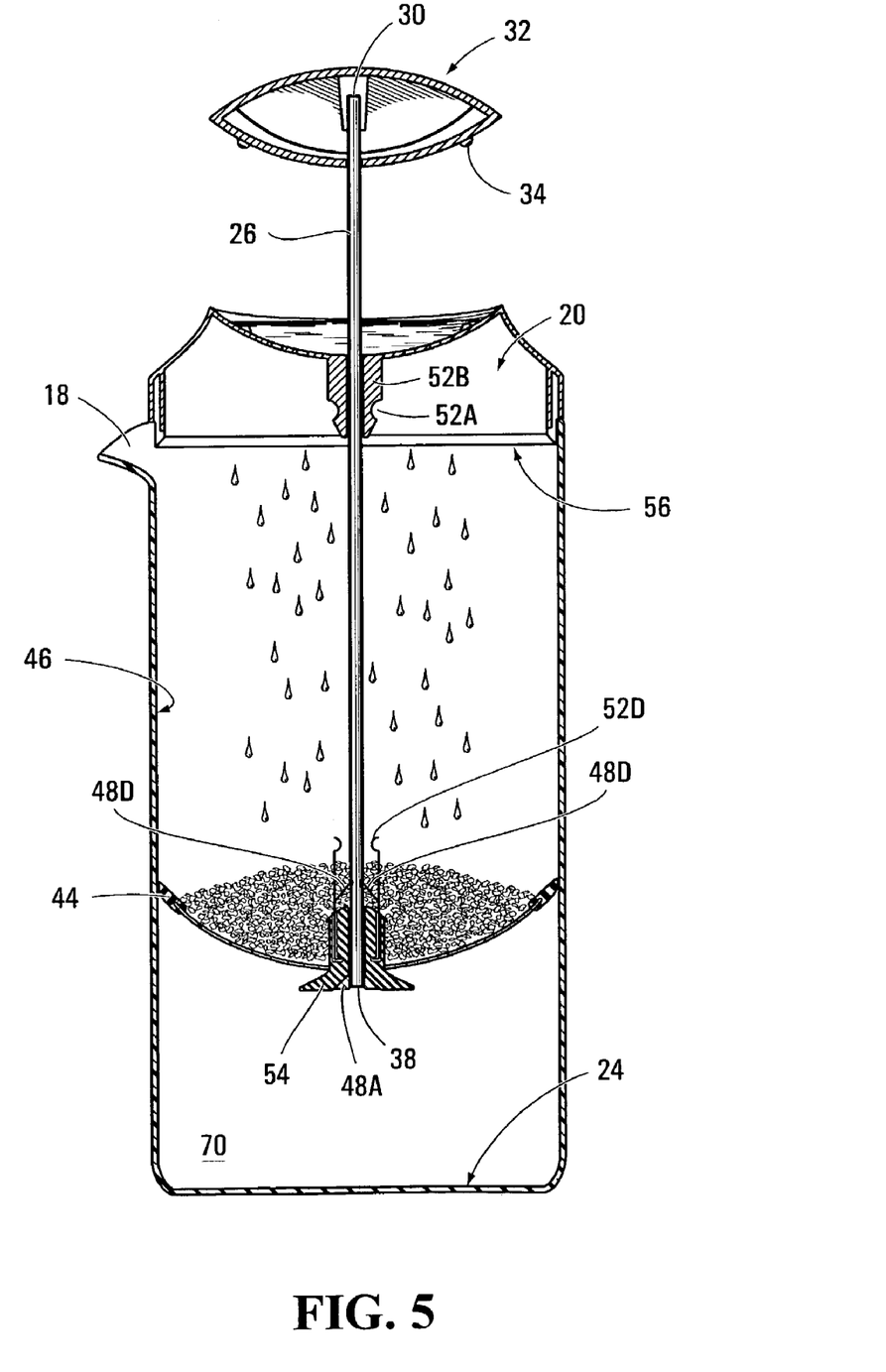
FIGS. 5 through 10 are sectional elevational views of the system of FIGS. 1 and 2 at different stages of infusion.
Figure 6:
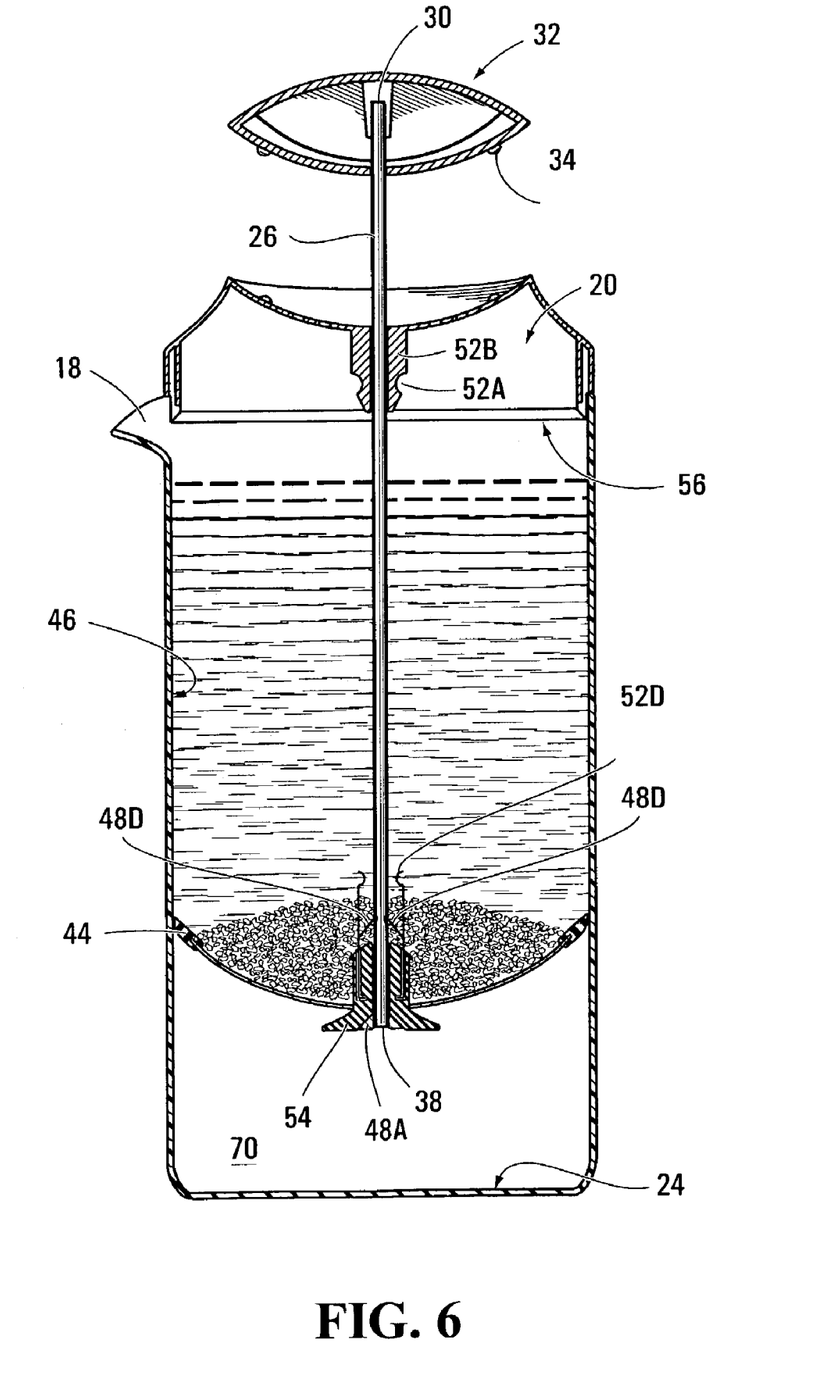

In order to commence infusion, liquid (e.g., hot water) is poured into the vessel with the intent of soaking the flavoring substance in the basket 36. Preferably, the liquid is poured onto the cover 20 and makes its way into the vessel 14 through the distribution system 22. This stage of the process is shown in FIG. 5. For reasons that will become apparent later on, it is advantageous to keep the pocket of air trapped underneath the basket 36 until all the liquid has been poured and infusion has begun. Thus, it would be advantageous if the flavoring substance could be soaked without causing exposure of the mesh of the screen 40. One way of achieving this effect is through appropriate design of the distribution system 22 in the cover 20.

Thus, in a specific embodiment, the distribution system 22 includes an arrangement of apertures 22. Those skilled in the art will find it within their ability to select suitable sizes and locations for the apertures 22 so as to achieve the effect of a fine shower of liquid emerging from a substantial portion of the undersurface of the cover 20. This has the advantageous effect of being able to soak the flavoring substance in the basket 36 without significantly agitating the flavoring substance as it is being soaked. Since the soaked particles of flavoring substance are unlikely to pass through the screen 40, the apertures 42 of the screen 40 will remain covered by the flavoring substance during the soaking process and hence air in the region 70 underneath the basket 36 will be prevented from escaping while liquid is being poured into the vessel 14.

As the remainder of the liquid enters the vessel 14 through the cover 20, the flavoring substance will continue to cover the screen 40, with the effect of causing the pocket of air to remain trapped in the region 70. Hence, there results the situation in FIG. 6, which remains the case until action is taken by the user to release the pocket of air. In a specific scenario, shown in FIG. 7, the user pushes the handle 32 towards the cover 20, which causes the basket 36 to move towards the bottom 24 of the vessel 14. (It is recalled that the basket 36 was previously positioned in such a way as to allow further downward travel within the vessel 14.) As a result of this motion, the pocket of air trapped in the region 70 is forced upwards and passes through the apertures 42 in the screen 40 by displacing the flavoring substance.

Figure 7:
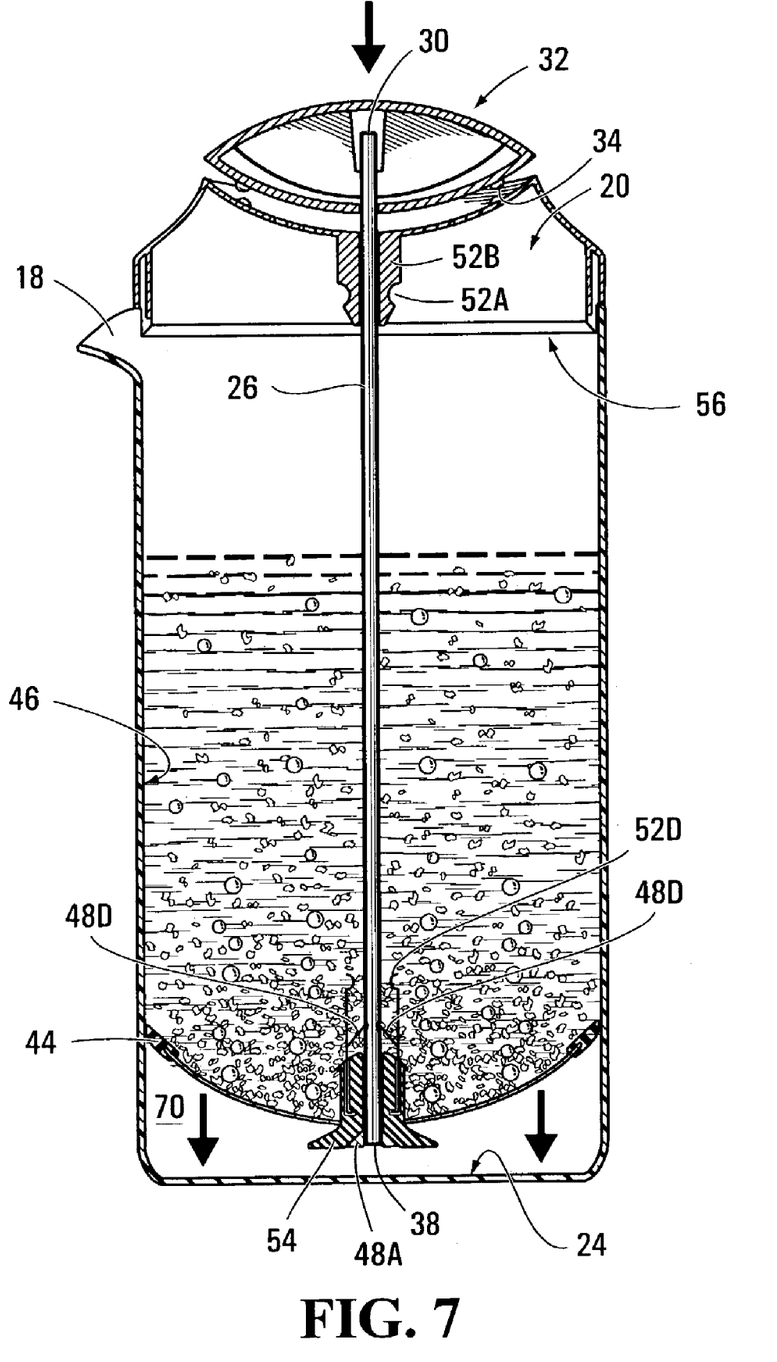
Figure 8:
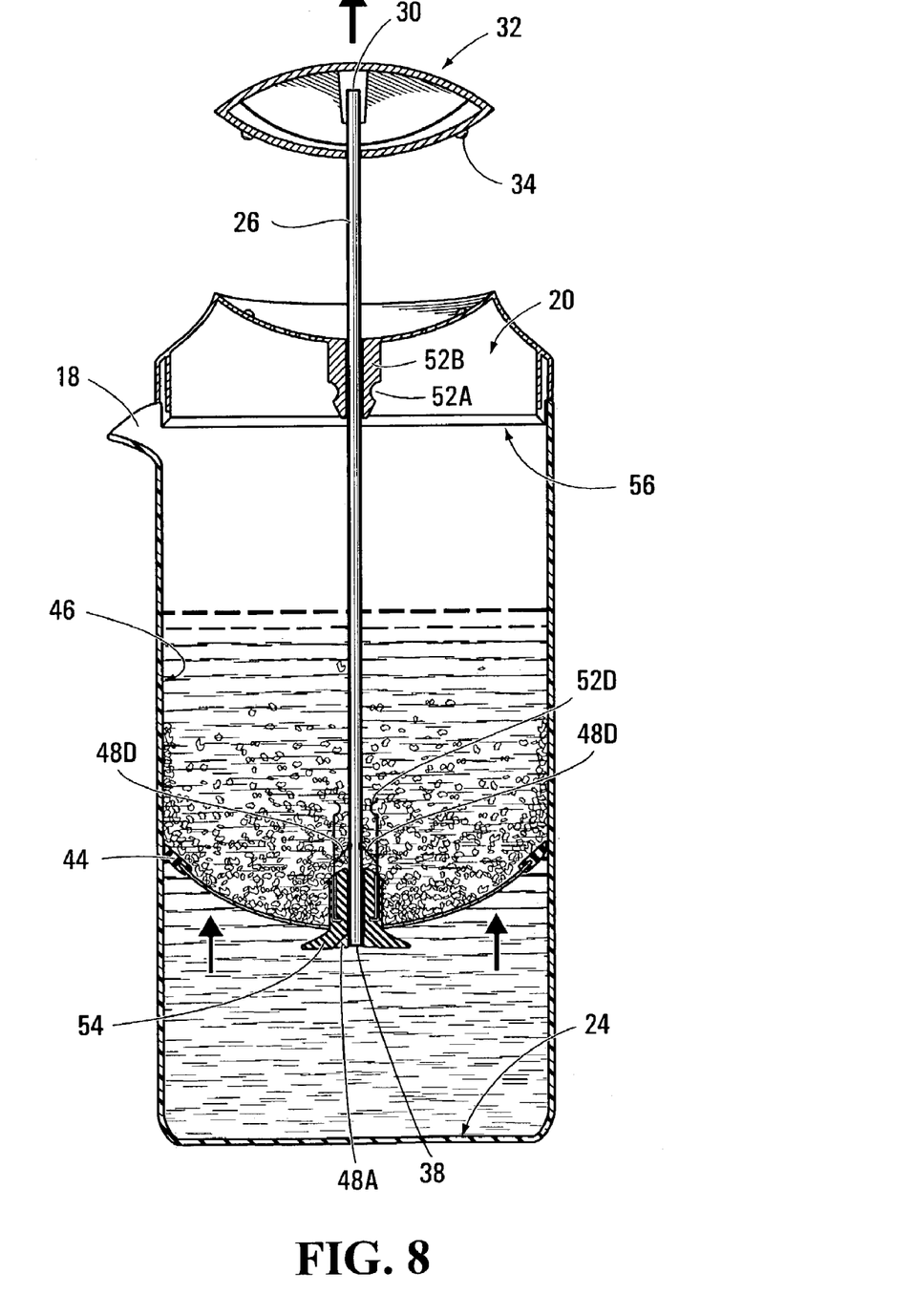
Figure 9:
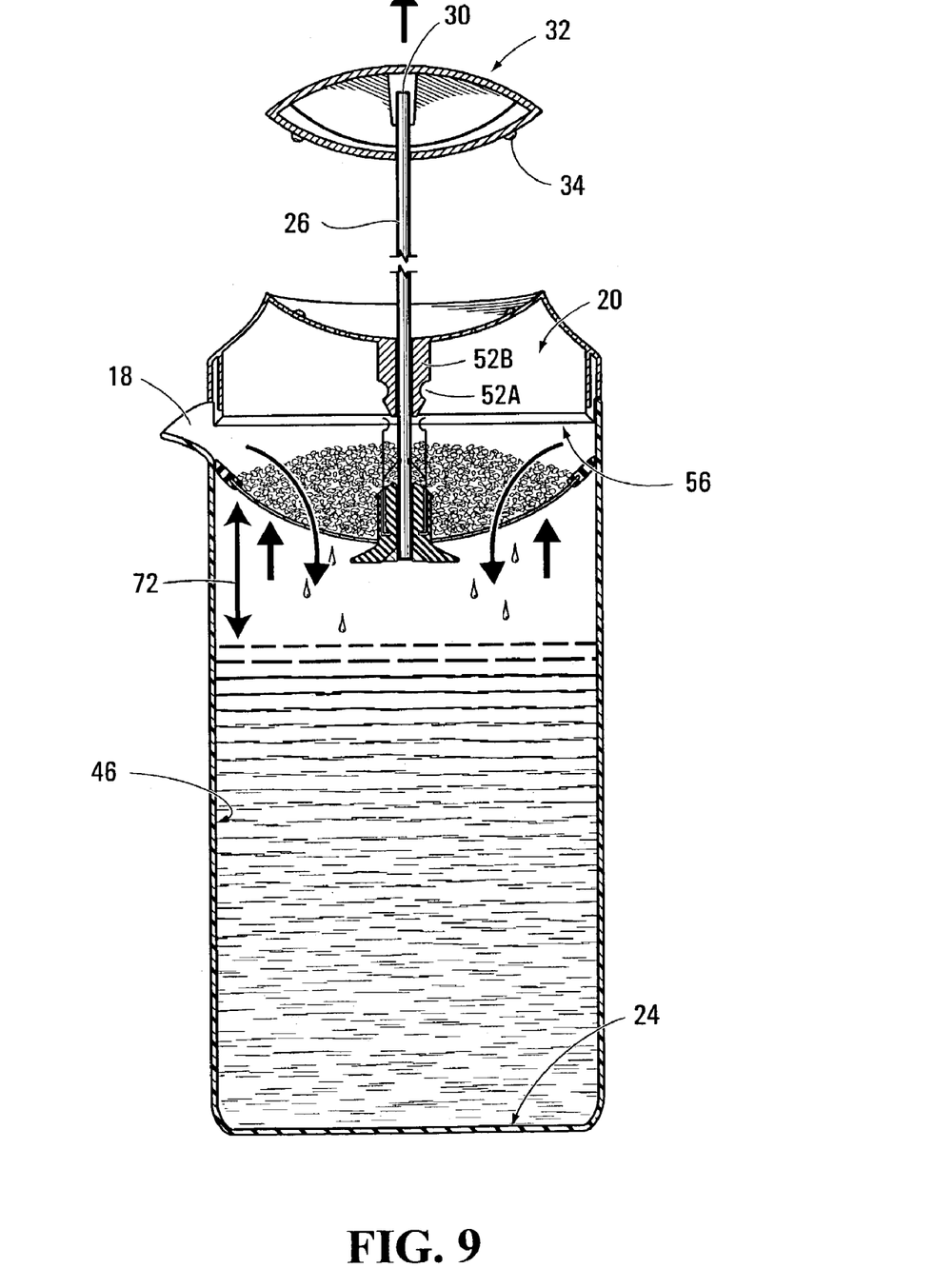

In doing so, some of the flavoring substance which had remained "stuck" to the bottom of the screen 40 or which was buried deep within the mound of flavoring substance is released and caused to be exposed to the liquid undergoing infusion. This leads to more efficient usage of the flavoring substance. Moreover, as the flavoring substance is displaced, it is dispersed throughout a greater portion of the volume of the vessel 14, resulting in improved contact of the flavoring substance and the liquid. This results in accelerated infusion of the flavoring substance, along with associated advantages such as less total heat loss during infusion due to the shorter process, resulting in an infused beverage that is hotter when ready to serve.

It is noted that some residual air may still remain trapped below the basket 36, even when the latter has been maximally lowered within the vessel 14. This is because some of the flavoring substance may have returned to the bottom of the basket 36 before the trapped air has had a chance to escape. Thus, by agitating the basket 36 through up-and-down action of the handle 32, the remainder of the trapped air can be expunged. This also increases the extent to which the flavoring substance comes into contact with the brew.

During infusion, it may be desirable to limit heat loss that occurs through the cover. To this end, the handle 32 may be configured so that the apertures 22 in the cover 20 are occluded when the handle 32 is positioned directly atop the cover 20. This advantageously prevents heat from escaping the vessel 14 through the apertures 22. If the apertures 22 are uniformly radially disposed about the cover 20, and if the shaft 26 passes through the center of the cover 20, then it is possible to design the handle 32 so that mere lowering of the handle 32 to the top surface of the cover 20 will cause all the apertures 22 to be occluded. Alternatively, in the design illustrated in the drawings, slight rotation of the handle 32 may be required to align the handle 32 with the apertures 22. Moreover, as shown in FIG. 2, the handle 32 may be equipped with plugs 34 for engaging a subset (or all) of the apertures 22 so as to prevent rotation of the handle 32 with respect to the cover 20 while the apertures 22 are covered, i.e., during the infusion process.

Once infusion is complete, the handle 32 is pulled upwards (see FIG. 8), causing the basket 36 to correspondingly rise towards the cover 20. In doing so, the screen 40 collects the majority of the flavoring substance in the brew, while the lip 44 picks up the remainder due to wiping action against the interior wall 46 of the vessel 14. It is therefore advantageous to design the periphery of the lip 44 at an upward angle so as to cause the spent flavoring substance being swept from the interior wall 46 of the vessel 14 to be directed into an area of the screen 40 closer to the center of the basket 36. The resulting "squeegee" effect thus wipes clean the interior wall 46 of the vessel 14 as the basket 36 is moved upwards through the infused beverage.

By continuing to pull on the handle 32, the basket 36 (travelling on its way to the cover 20) will eventually be raised beyond the level of the infused beverage, at which point another advantageous effect is produced. Specifically, with reference to FIG. 9, as the basket 36 is pulled upwards, a space 72 is created intermediate the underside of the basket 36 and the upper surface of the infused beverage. This space, which gradually increases as the handle 32 continues to be pulled, must be replaced by ambient air, which can only enter via the screen 40 and/or via the space between the lip 44 and the interior wall 46 of the vessel 14. Assuming that the lip 44 tightly contacts the interior wall 46 of the vessel, it follows that ambient air will be forced to enter the intermediate space 72 through the screen 40, causing a vacuum drying effect and resulting in the formation of a compressed cake of spent flavoring substance in the basket 36. This resulting cake is usually so dry that the spent flavoring substance will not drip back into the infused beverage, which has advantages in terms of improved flavor. In addition, this results in a device 10 that causes little mess and is easy to clean.

Figure 10:
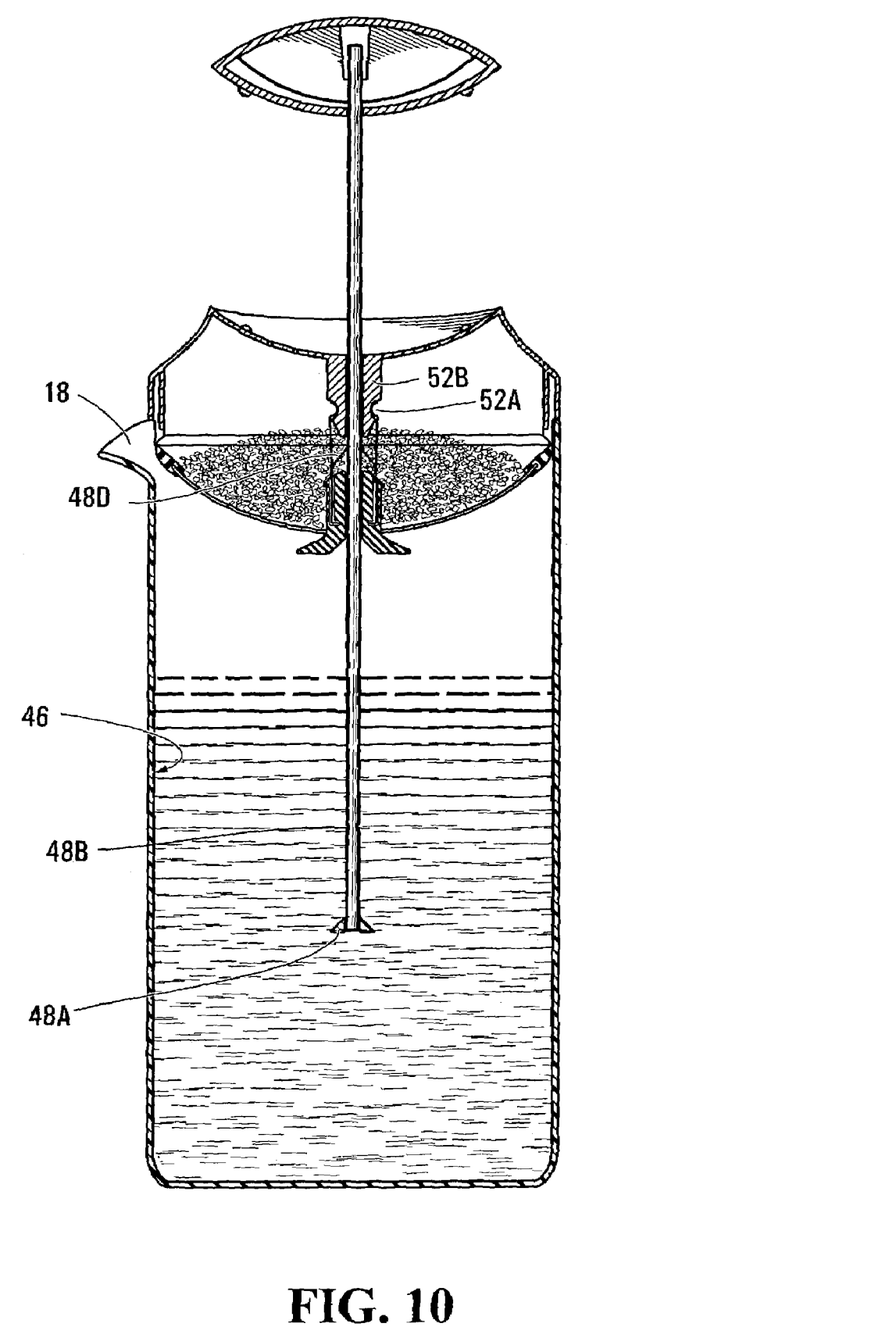

Since the spent flavoring substance contains insufficient moisture to drip back into the infused beverage, it can be retained in its overhanging position while the infused beverage is poured. Accordingly, by providing an optional locking mechanism, the basket 36 can be locked to the undersurface of the cover 20, as shown in FIG. 10. It should be expressly noted that the locking mechanism, which is optional, is not limited solely to the example realization described hereinafter in detail. Rather, any type of mechanical lock that can secure the basket 36 within the cover 20 is envisaged.

The locking mechanism is capable of acquiring a locked state in which the basket 36 is secured to the cover 20 and an unlocked state in which the basket 36 is free to move with respect to the cover 20. Accordingly, the locking mechanism includes a portion on the cover 20 and a cooperating portion on the basket 36. In one non-limiting example embodiment, the cover portion of the locking mechanism includes a channel 52A carved in a projection 52B underneath the cover 20. The basket portion of the locking mechanism includes a set of one or more protrusions 52D biased towards the axis 27 of the shaft 26 and capable of fitting within the channel 52A. Biasing of the protrusions 52D towards the axis 27 of the shaft 26 may be achieved by a biasing element 50, such as a rubber O-ring, an elastic or an open-ended stainless steel ring having an arc length greater than 360 degrees. Alternatively, biasing may be achieved inherently through formation of the protrusions 52D as leaf springs. Of course, other biasing elements will be known to those of ordinary skill in the art.

In order to cause the locking mechanism to acquire its locked state, the basket 36 is pressed against the undersurface of the cover 20 until the protrusions 52D enter the channel 52A. This is achieved by pulling (upwards) on the handle 32, which causes the basket 36 to meet the projection 52B. Since the projection 52B is tapered, pulling on the handle 32 will have caused the protrusions 52D to separate until they fall into the channel 52A. It is recalled that the protrusions 52D are biased towards the axis 27 of the shaft 26. Also, the protrusions 52D can have curved portions which assist in retaining the protrusions 52D in the channel 52A until forced out under an external influence.

In an alternative embodiment of the locking mechanism, the locked state is acquired through rotation of the basket 36 and the handle 32 in a first direction (e.g., clockwise) such that mating portions of the basket 36 and the cover 20 engage with one another to hold the basket 36 underneath the cover 20. Once it is desired to remove the basket 36 from the cover 20 (e.g., for cleaning purposes), rotational motion is applied in the opposite direction so that the mating portions of the basket 36 and the cover 20 disengage from one another. This allows the basket retaining mechanism to acquire its unlocked state in which the basket 36 is again free to move with respect to the cover 20.

Once the basket 36 and the lip 44 have traveled all the way up to the undersurface of the cover 20, such that the basket 36 is locked to the undersurface of the cover 20, the lip 44 contacts a second seal 56 that surrounds the periphery of the cover 20. The combination of the lip 44 and the seal 56 results in the formation of a chamber that contains the spent flavoring substance.

Those skilled in the art will appreciate that the infused beverage made by the system and method of the present invention can remain in the vessel 14 for a desired amount of time prior to being consumed or poured. The aging of the coffee or tea in the vessel 14 is not subject to flavor degradation that could be due to leaving spent flavoring substance in the infused beverage, since the vast majority of the spent flavoring substance will be retained in the screen 40 and thus will remain out of contact with the infused beverage.

In addition, the infused beverage lends itself to being reheated. In particular, the entire system may be placed on a heating element (e.g., a mug warmer). The device 10 may thus remain mounted on the vessel 14 during this operation. Because of a lack of large particles of spent flavoring substance in the infused beverage, the unpleasant taste of burnt coffee beans or tea leaves is avoided, with the end result being that the reheated coffee or tea is likely to have a taste that the user will find satisfactory.

In order to pour the infused beverage out of the vessel 14 and into a cup or mug, the vessel 14 is simply tilted towards the spout 18. Advantageously, the basket 36 will have a profile that leaves sufficient room between it and the spout 18 to allow a flow of the infused beverage to take place without contacting the screen 40. To this end, it may be advantageous to specially design the spout 18 with this objective in mind, although it will be understood that most ordinary spouts provide the added space for allowing the infused beverage to stream out of the vessel 14 with very little, if any, contact with the spent flavoring substance. Also, it is noted that contact between the infused beverage and the lip 44 (and/or the seal 56) is permitted since it has no effect on the flavor of the infused beverage that is being poured out of the vessel 14.

Moreover, it may be advantageous to move the handle 32 and the shaft 26 out of the way when the infused beverage is poured out of the vessel 14. This can be done in myriad ways. For example, once the handle 32 has been pulled all the way up, the shaft and the handle 32 can simply be removed, e.g., by depressing a release button or by performing an unscrewing motion. In other embodiments, the extended shaft 26 may be bent or pivoted back on itself, when bent, the shaft 26 and the handle 32 may join a portion of the exterior surface of the vessel 14 (e.g., the grip 58) and thus become an integral part thereof.

In still other embodiments, the locking mechanism (which secures the basket 36 to the undersurface of the cover 20) may be configured to cooperate with a second mechanism whereby the handle 32 can now be pushed back down towards the bottom 24 of the vessel 14 while the basket 36 remains secured to the undersurface of the cover 20. For example, in the illustrated embodiment, entry of the protrusions 52D into the channel 52A causes a set of fingers 48D to disengage from a groove 48B in the shaft 26. This facilitates movement of the end 30 of the shaft 26 relative to the basket 36. Accordingly, the handle 32 can be pushed towards the cover 20 and the shaft 26 moved out of the way. Other embodiments envisage a shaft equipped with a telescoping mechanism whereby the frictional forces of the telescoping mechanism are overcome as soon as the basket 36 is locked to the undersurface of the cover 20, allowing the handle 32 to be brought back down in proximity to the upper surface of the cover 20.

For cleaning purposes, the locking mechanism should acquire its unlocked state. In one specific embodiment, this is achieved by pulling the basket 36 away from the cover 20 towards the end 38 of the shaft 26. This step is normally required only once the infused beverage is ready to be served. Clearly, applying a sufficient pulling force on the basket 36 itself will cause the protrusions 52D (due to their curved surfaces) to slide out of the channel 52A. To facilitate this procedure, an enlargement 54 can be provided proximate the bottom of the basket 36. The enlargement 54 allows a user to easily disengage the basket 36 from the projection 52B of the cover 20.

In the illustrated embodiment, if the basket 36 is brought all the way back to the end 38 of the shaft 26, then the set of fingers 48D will re-engage the groove 48B in the shaft 26, which prevents movement of the end 30 of the shaft 26 relative to the basket 36. The enlargement 54 will then appear at the end 38 of the shaft 26 where the knob 48A is located. By designing the enlargement 54 to have a flat surface, the device 10 in its entirety can be supported once removed from the vessel and placed upon a surface such as on a saucer or in a sink prior to cleaning. It may also be advantageous to design the knob 48A so that it is flush with the enlargement 54.

While specific embodiments of the present invention have been described and illustrated, it will be apparent to those skilled in the art that numerous modifications and variations can be made without departing from the scope of the invention as defined in the appended claims.

What is claimed is:

1. A device for making coffee, comprising:
    (a) a cover adapted to be positioned on a vessel with an interior wall, said cover comprising a transverse passageway therethrough, an upper surface, an undersurface and a distribution system for allowing fluid communication between said upper surface and said undersurface, said distribution system comprising a plurality of apertures adapted to cause liquid poured onto said upper surface to emerge from said undersurface as a fine shower and wherein said cover defines a basin for temporarily storing a limited quantity of liquid prior to its entering the vessel through said distribution system;
    (b) a shaft extending through said passageway of said cover, said shaft comprising an end intended to remain outside the vessel;
    (c) a handle attached to said end of said shaft, said handle being of a dimension suitable to occlude said apertures when said handle is lowered onto said cover;
    (d) a basket adapted to hold a flavoring substance, said basket having a periphery, said basket being mounted to said shaft such as to allow said basket to be raised and lowered within the vessel through action of said shaft; and
    (e) a continuous lip of flexible polymer surrounding the periphery of said basket for engagement with the interior wall of the vessel.

2. The device defined in claim 1, wherein said handle comprises a set of plugs registering with corresponding ones of said apertures to close said corresponding ones of said apertures when said handle is lowered onto said cover.

3. The device defined in claim 2, wherein said basket comprises a screen for limiting the size of particulate matter capable of passing therethrough.

4. The device defined in claim 3, further comprising a lock capable of acquiring a locked state in which said basket is retained proximate said undersurface of said cover and an unlocked state in which said basket is capable of moving with respect to said undersurface of said cover.

5. A device for making coffee, comprising:
(a) a cover adapted to be positioned on a vessel with an interior wall, said cover comprising a transverse passageway therethrough, an upper surface facing away from the interior wall of the vessel and an opposite undersurface facing toward the interior wall of the vessel, said upper surface comprising a plurality of apertures for allowing liquid poured onto said upper surface to emerge from said undersurface and soak ground coffee beans without significantly agitating them;
(b) a shaft extending through said passageway of said cover; and
(c) a basket for holding the ground coffee beans, said basket being mounted to said shaft such as to allow said basket to be raised and lowered within the vessel through action of said shaft;
wherein said upper surface of said cover defines a basin for temporarily storing a limited quantity of liquid prior to its entering the vessel; and
wherein sizes and locations of said apertures allow the liquid to emerge from said undersurface of said cover as a fine shower.

6. The device defined in claim 5, wherein said shaft comprises an end intended to remain outside the vessel and wherein said device comprises a handle attached to said end of said shaft.

7. The device defined in claim 6, wherein said basket has a periphery with a continuous lip for engaging the interior wall of the vessel.

8. The device defined in claim 7, wherein said lip is capable of wiping the interior wall of the vessel when said basket is raised towards said cover.

9. The device defined in claim 6, wherein said handle is of a dimension suitable to occlude said apertures when said handle is lowered onto said cover.

10. The device defined in claim 5, wherein, once infusion is completed, said basket is movable proximate said undersurface of said cover such that infused ground coffee beans remain out of contact with the coffee.

11. The device defined in claim 10 further comprising a lock capable of acquiring a locked state in which said basket is retained proximate to said undersurface of said cover.

12. The device defined in claim 10 further comprising first and second locking mechanisms, said first locking mechanism, when engaged, being capable of retaining said basket proximate to said undersurface of said cover and said second locking mechanism, when disengaged, allowing a sliding movement of said shaft with respect to said basket.

13. The device defined in claim 12, wherein said second locking mechanism, when engaged, prevents sliding movement of said shaft with respect to said basket.

14. The device defined in claim 13, wherein said first locking mechanism when disengaged, allows movement of said basket with respect to said cover.

15. The device defined in claim 14, wherein said first locking mechanism being engageable upon sliding said basket into contact with said cover while said second locking mechanism is engaged.

16. The device defined in claim 15, wherein said second locking mechanism comprises:
(a) on said shaft, (i) a knob and a (ii) groove located a least part of the way between said knob and said handle; and
(b) on said basket, (i) a passageway narrower than said knob and (ii) at least one finger biased towards said shaft, said at least one finger occupying said groove when said second locking mechanism is engaged.

17. The device defined in claim 16, wherein said first locking mechanism comprises:
(a) on said cover, (i) a projection extending from the undersurface of said cover and defining a passageway for receiving said shaft and (ii) a channel extending circumferentially around said projection; and
(b) on said basket, at least one protrusion biased towards said shaft, said at least one protrusion being received in said channel when said first locking mechanism is engaged.

18. The device defined in claim 17, wherein movement of said basket towards said undersurface of said cover causes said at lease one protrusion to enter into said channel.

19. The device defined in claim 18, wherein said at least one protrusion entering into said channel causes said at least one finger to exit said groove and clear said shaft.

20. The device defined in claim 19, wherein said shaft defines a central axis and wherein said projection is tapered, such that said at least one protrusion enters into said channel following a gradual distancing of said protrusion from the central axis of said shaft.

21. The device defined in claim 20, further comprising a biasing element for biasing said at least one protrusion towards said shaft and for biasing said at least one finger towards said shaft.

22. A device for making coffee, comprising:
(a) a cover adapted to be positioned on a vessel with an interior wall, said cover comprising a transverse passageway therethrough, an upper surface facing away from the interior wall of the vessel and an opposite undersurface facing toward the interior wall of the vessel, said upper surface defining a basin for temporarily storing a limited quantity of liquid prior its entering the vessel;
(b) a shaft extending through said passageway of said cover;
(c) a basket for holding ground coffee beans, said basket being mounted to said shaft such as to allow said basket to be raised to an upper position in which said basket is proximate said undersurface of said cover and to be lowered to a lower position in which said basket is remote from said undersurface of said cover;
(d) a first locking mechanism that, when engaged, is capable of retaining said basket in said upper position; and
(e) a second locking mechanism that, when disengaged, allows sliding movement of said shaft with respect to said basket; wherein, once infusion is completed, said basket is movable to said upper position such that infused ground coffee beans remain out of contact with the coffee.

23. The device defined in claim 22, wherein said upper surface of said cover comprises a plurality of apertures for allowing liquid poured onto said upper surface to emerge from said undersurface as a fine shower.

24. The device defined in claim 22, wherein said shaft comprises an end intended to remain outside the vessel and wherein said device comprises a handle attached to said end of said shaft.

25. The device defined in claim 22, wherein said basket has a periphery with a continuous lip for engaging the interior wall of the vessel.

26. The device defined in claim 22, wherein said lip is capable of wiping the interior wall of the vessel when said basket is raised towards said cover.

27. The device defined in claim 22, wherein said second locking mechanism, when engaged, prevents sliding movement of said shaft with respect to said basket.

28. The device defined in claim 22, wherein said first locking mechanism, when disengaged, allows movement of said basket with respect to said cover.

29. A device for making coffee, comprising:
(a) a cover adapted to be positioned on a vessel with an interior wall, said cover comprising a transverse passageway therethrough, an upper surface facing away from the interior wall of the vessel and an opposite undersurface facing toward the interior wall of the vessel, said upper surface of said cover comprising a plurality of apertures for allowing liquid poured onto said upper surface to emerge from said undersurface and soak ground coffee beans without significantly agitating them;
(b) a shaft extending through said passageway of said cover;
(c) a basket for holding the ground coffee beans, said basket being mounted to said shaft such as to allow said basket to be raised and lowered within the vessel through action of said shaft;
(d) a first locking mechanism that, when engaged, is capable of retaining said basket proximate to said undersurface of said cover; and
(e) a second locking mechanism that, when disengaged, allows sliding movement of said shaft with respect to said basket; wherein, once infusion is completed, said basket is movable proximate to said undersurface of said cover such that infused ground coffee beans remain out of contact with the coffee.

30. The device defined in claim 29, wherein sizes and locations of said apertures allow the liquid to emerge from said undersurface as a fine shower.

31. The device defined in claim 29, wherein said upper surface of said cover defines a basin for temporarily storing a limited quantity of liquid prior to its entering the vessel.

32. The device defined in claim 29, wherein said shaft comprises an end intended to remain outside the vessel and wherein said device comprises a handle attached to said end of said shaft.

33. The device defined in claim 29, wherein said basket has a periphery with a continuous lip for engaging the interior wall of the vessel.

34. The device defined in claim 33, wherein said lip is capable of wiping the interior wall of the vessel when said basket is raised towards said cover.

35. The device defined in claim 29, wherein said second locking mechanism, when engaged, prevents sliding movement of said shaft with respect to said basket.

36. The device defined in claim 29, wherein said first locking mechanism, when disengaged, allows movement of said basket with respect to said cover.

37. A device for making coffee, comprising:
(a) a cover adapted to be positioned on a vessel with an interior wall, said cover comprising a transverse passageway therethrough, an upper surface facing away from the interior wall of the vessel and an opposite undersurface facing toward the interior wall of the vessel, said upper surface comprising a plurality of apertures for allowing liquid poured onto said upper surface to emerge from said undersurface and soak ground coffee beans without significantly agitating them;
(b) a shaft extending through said passageway of said cover; and
(c) a basket for holding the ground coffee beans, said basket being mounted to said shaft such as to allow said basket to be raised and lowered within the vessel through action of said shaft;
wherein said upper surface of said cover defines a basin for temporarily storing a limited quantity of liquid prior to its entering the vessel;
wherein sizes and locations of said apertures allow the liquid to emerge from said undersurface of said cover as a fine shower; and
wherein, once infusion is completed, said basket is movable proximate said undersurface of said cover such that infused ground coffee beans remain out of contact with the coffee and said device further comprises a lock capable of acquiring a locked state in which said basket is then retained proximate to said undersurface of said cover.

* * * * *